Figure 1:
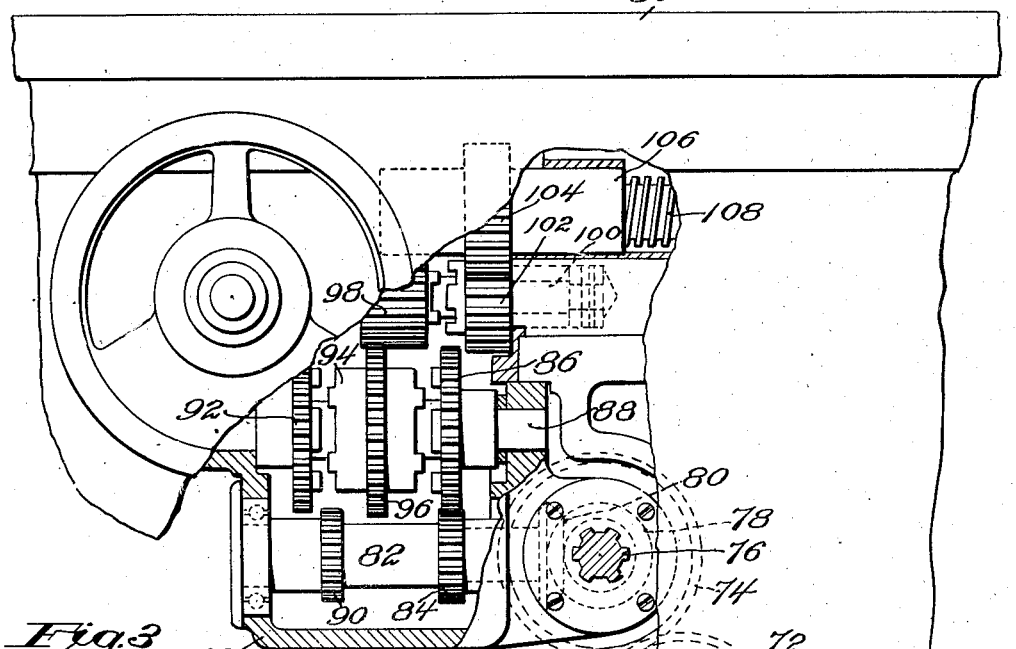

July 23, 1946.　　　G. B. HIRSCH　　　2,404,439

DRIVING AND CONTROL MECHANISM

Filed July 31, 1943　　　4 Sheets-Sheet 1

Witness
Jas J. Maloney.

Inventor
George B. Hirsch,
by Maxwell Fish
atty.

July 23, 1946.  G. B. HIRSCH  2,404,439
DRIVING AND CONTROL MECHANISM
Filed July 31, 1943  4 Sheets-Sheet 2

July 23, 1946.   G. B. HIRSCH   2,404,439
DRIVING AND CONTROL MECHANISM
Filed July 31, 1943   4 Sheets-Sheet 3

Witness
Jas. J. Maloney

Inventor
George B. Hirsch
by Maxwell Fish
Atty.

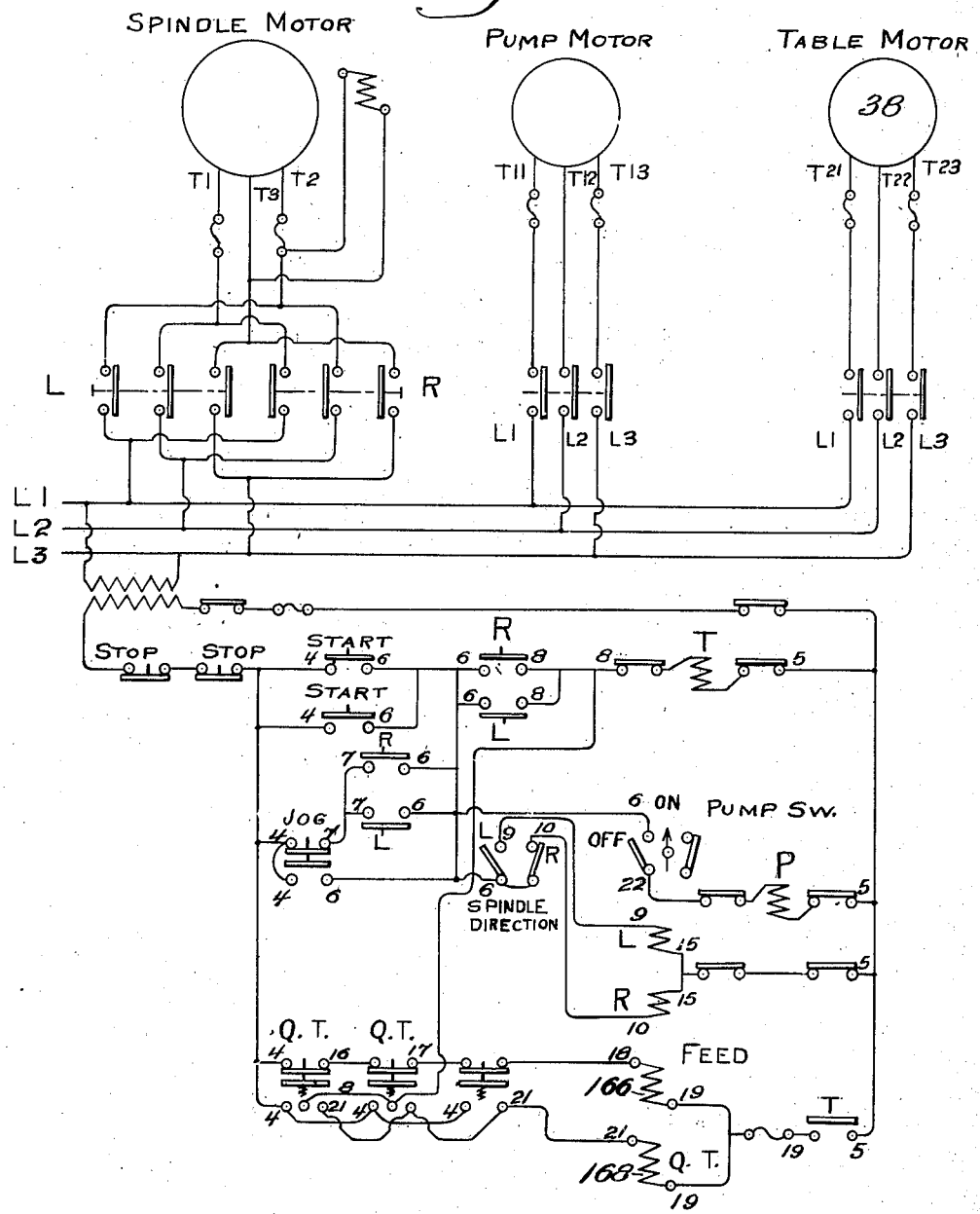

Patented July 23, 1946

2,404,439

UNITED STATES PATENT OFFICE 2,404,439

DRIVING AND CONTROL MECHANISM

George B. Hirsch, Providence, R. I., assignor to Brown and Sharpe Manufacturing Company, a corporation of Rhode Island Application July 31, 1943, Serial No. 496,931

15 Claims. (Cl. 90—21)

The present invention relates to driving and control mechanisms.

The invention is herein disclosed in a preferred form as embodied in a milling machine of the general type having a rotary milling cutter spindle and a work supporting assembly including a longitudinally reciprocable table and a transversely movable saddle support. The driving connections for the work supporting assembly comprise an electric motor, feed and quick traverse gear trains continuously driven therefrom, a feed-quick traverse clutch shiftable between an intermediate neutral position and alternative feed and quick traverse positions, and branch line transmissions therefrom for driving each of the several supports. An individual electric motor having appropriate driving connections therefrom is provided for driving the milling cutter spindle. For controlling the operation of the machine, an electrical control system is provided which operates through the agency of switch connections to start and stop the spindle and work support assembly motors. The feed-quick traverse clutch is constructed and arranged to be operated by means of the electrical control system in connection with the starting and stopping of the driving motors for the tool and work supports.

It is a principal object of the invention to provide a novel and improved mechanism for controlling the operation of the feed-quick traverse clutch in a machine of this general description.

More specifically, it is an object of the invention to provide a novel and improved power operated shifting mechanism for the clutch which is constructed and arranged to be readily controlled by electrical means for shifting the clutch from any one to another of its feed and quick traverse clutching and intermediate neutral positions.

It is a further object of the invention to provide a power operated, electrically controlled shifting mechanism of the general type described for a feed-quick traverse clutch which is particularly adapted for use in a milling machine having electrically operated and controlled power driving means for the work supporting assembly and milling cutter spindle to cause the clutch to be shifted automatically from either the feed or quick traverse running position to neutral to bring the work support to a quick stop whenever the power is shut off in order to prevent possible coasting of the work support with the milling cutter of the machine stationary.

With these and other objects in view, as may hereinafter appear, a feature of the invention consists in the provision of a control mechanism for a feed-quick traverse clutch comprising mechanically operated shift devices which are well adapted to be operated by means of solenoids forming part of the electrical control system of the machine. In the illustrated form of the invention, the clutch shifting mechanism comprises a series of shift cam surfaces formed on the opposite faces of a large driving gear continuously driven from the support driving motor, an axially shiftable and rotatable clutch shifting rod having at one end thereof a pair of clutch shifting fingers arranged to be brought into different operative positions with relation to the shifting cams by rocking movements imparted to the rod to shift the rod and clutch axially from one to another of said positions, and electrically operated means including solenoids for controlling the angular position of the shift rod.

In accordance with another feature of the invention, a mechanism is provided for positively controlling the angular movement of the shift rod under the influence of its actuating solenoids in relation to the axial shifting movement thereof to avoid possible interference of the parts under certain conditions as, for example, when the electrical controls are operated in such a manner as to call for a shifting movement of the feed-quick traverse clutch from one to the other clutching position. This mechanism comprises an abutting surface on the shift rod which is arranged to be brought alternatively over one or the other of two relatively stationary plungers by axial movement of the rod, so that when the shift rod has been rocked and shifted axially to clutching position, a manipulation of the electrical controls tending to shift the clutch to the alternative clutching position is effective only to turn the shift rod rotationally to the intermediate position where it is held by the engagement of the cooperating plunger with the abutting surface while the shift rod is shifted to the neutral position. When the shift rod has been moved axially to the intermediate neutral position of Fig. 2, the pull exerted by the electrical devices becomes operative to continue the rocking movement of the shift rod to the alternate extreme angular position, so that the cooperating shift finger is located with relation to its actuating cams to continue the axial shifting movements of the shift rod to the clutching position.

In accordance with another feature of the invention, an improved braking and detent mechanism is provided which serves to maintain the clutch control rod yieldably in each of its neutral and feed and quick traverse positions, and also serves automatically to engage the brake when the clutch is shifted to the neutral position.

Figure 3:
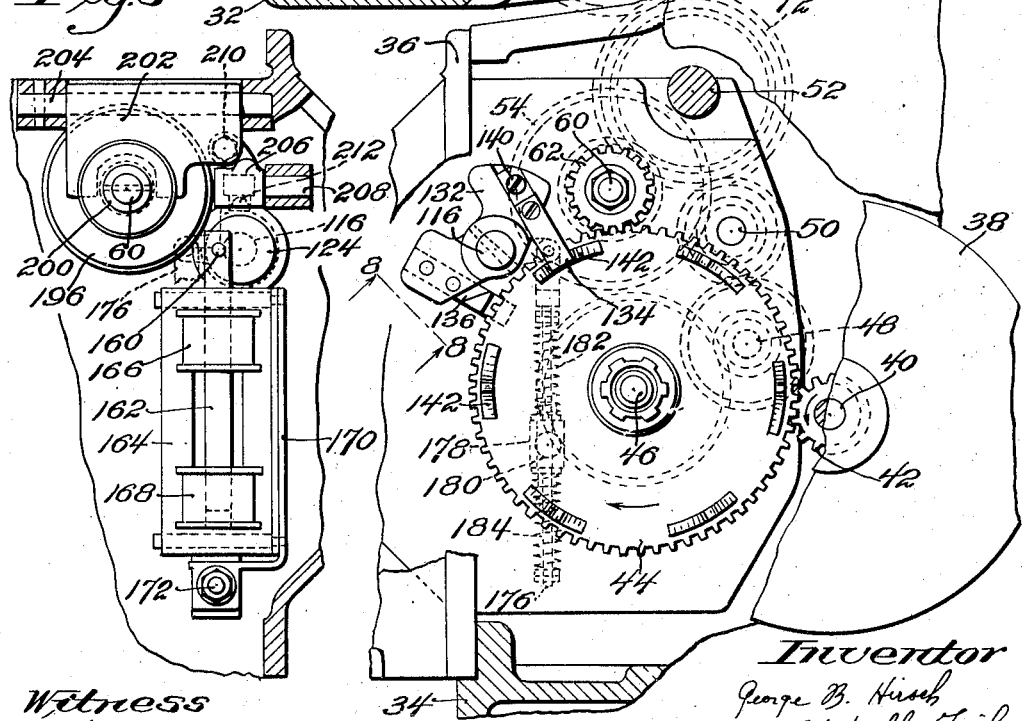
Figure 4:
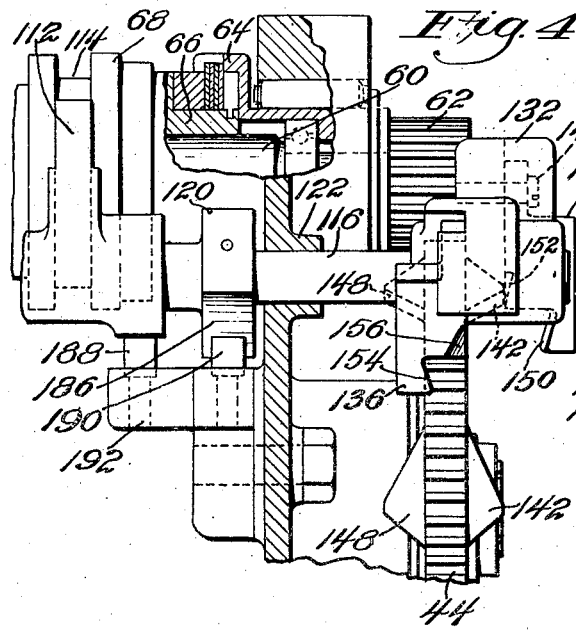
Figure 5:
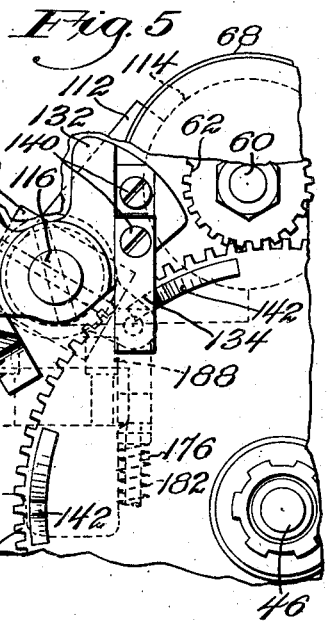
Figure 6:
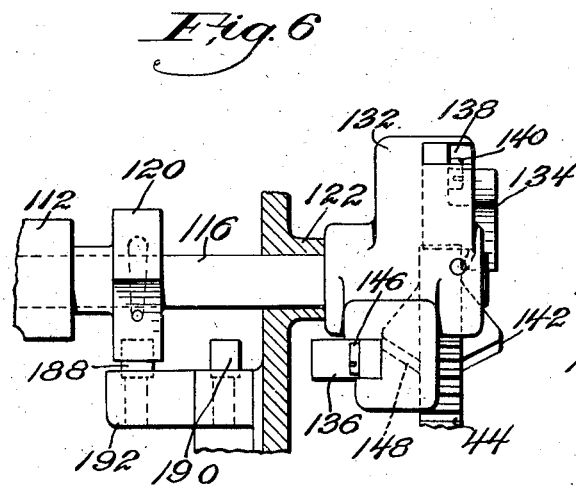
Figure 7:
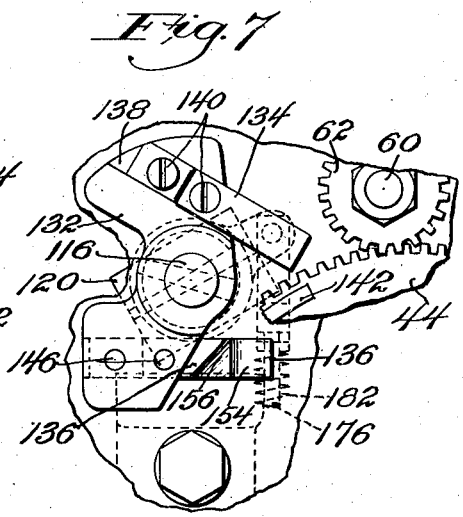
Figure 8:
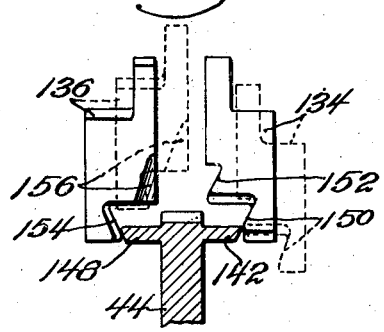

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a somewhat fragmentary view in front elevation showing a portion of the work supporting assembly of a milling machine, a portion of the casing being broken away to illustrate particularly the driving connections for the table and saddle supports; Fig. 2 is an enlarged detail view partly in section illustrating particularly the feed-quick traverse clutch and the shifting mechanism therefor; Fig. 3 is a view looking from the left of Fig. 2, but on a smaller scale, illustrating particularly the solenoid for controlling the operation of the feed-quick traverse clutch shifting mechanism and the mechanical brake associated with the feed-quick traverse clutch; Fig. 4 is an enlarged detail view illustrating particularly the clutch shifting cams and fingers shown in Fig. 2, but with the parts in the quick traverse position; Fig. 5 is a view of the parts shown in Fig. 4, looking from the right; Fig. 6 is a somewhat fragmentary view of the clutch shifting fingers and cams looking in the direction of Fig. 4, but with the parts in the feed position; Fig. 7 is a view of the parts shown in Fig. 6, looking from the right; Fig. 8 is an enlarged detail view partly in section taken on the line 8—8 of Fig. 1, illustrating the clutch shifting fingers and cams in the neutral position; and Fig. 9 is a wiring diagram of the machine illustrating the manner in which the clutch shifting solenoid is controlled to shift the feed-quick traverse clutch with relation to the several operating controls of the machine.

Referring specifically to the drawings, Fig. 1 discloses a portion of the work supporting assembly of a milling machine comprising a longitudinally movable work table 30, a transversely movable saddle support 32 and a base 34 within which is formed a gear box 36 containing the variable speed driving connections for the work supporting assembly of the machine. In the illustrated machine, the drive for the saddle support 32 and table 30 is taken from an electric motor 38 having an armature shaft 40 and a pinion 42 mounted thereon for engagement with a large driving gear 44 supported on a shaft 46. The variable speed feed drive for the movable supports is taken from the shaft 46 through a system of change speed gearing indicated generally in dotted lines in Fig. 1, carried on a series of supporting shafts 48, 50 and 52, terminating in gears 54, 56 (see Fig. 2), which form an integral part of the feed driving element 58 of a feed-quick traverse clutch supported on a shaft 60. The quick traverse drive for the movable supports is taken from the gear 44 through a pinion 62 loosely supported to turn on the supporting shaft 60, and forming an integral part of the quick traverse driving element 64 of the feed-quick traverse clutch. The feed-quick traverse driving clutch of the present machine is of a standard construction available in the market, and is illustrated generally as including the feed and quick traverse driving elements 58 and 64 of the clutch, a sleeve member 66 which is identified as the driven element secured to turn with the supporting shaft 60, and a control collar 68 slidable on the sleeve member 66 in either direction from the neutral position shown in Fig. 2, to limiting positions in each direction in which the feed and quick traverse driving clutch elements are operatively connected. The shaft 60 through which the drive is taken from the clutch has rigidly secured thereto a gear 70 which meshes with a gear 72 on shaft 52 which in turn meshes with a gear 74 secured on a rearwardly extending splined drive shaft 76 through which the drive is transferred to the saddle support 32 of the machine. The drive is taken from shaft 76 through a bevel gear 78 slidably supported on the spline shaft 76, and a bevel gear 80 on a horizontal shaft 82 in the saddle support 32. A gear 84 on the shaft 82 meshes with a driving element 86 of a table reversing clutch carried on a short supporting shaft 88. A gear 90 on the shaft 82 is connected through an intermediate idler gear (not shown) with a reverse driving element 92 on the shaft 88. The driven element of the reverser comprises a clutch member 94 supported for axial movement on the shaft 88 from the intermediate neutral position shown in Fig. 1, into engagement alternatively with clutch faces formed on the driving elements 86, 92 of the reverser. The gear 96 formed on the driven clutch member 94 meshes with a clutch gear 98 which is carried by a shaft 100 which also carries clutch gear 102 for power driving the table. The gear 102 meshes with a gear 104 formed on the driving nut 106 of a feed screw and nut driving connection for the table. In the illustrated form of the invention, the feed screw 108 is of the non-rotating type, being rigidly secured to the work table, and the nut 106 is externally supported on the saddle support against movement axially with the table.

A feature of the present invention consists in the provision of a novel power actuated shifting mechanism for shifting the feed-quick traverse clutch which is particularly adapted and arranged to be controlled through the agency of electrical devices including solenoids. The shifting mechanism for the clutch comprises a shifting fork 112 which engages in an annular groove 114 formed in the sliding collar 68 above described, and is carried on an axially shiftable control rod 116. The shifting fork 112 is supported on the control rod between a shoulder 118 and a collar 120 for movement axially as a unit therewith. The control rod is supported adjacent one end in a bearing 122 formed in the machine frame, and at its other end within a sleeve element 124 which is externally supported for rotational movement in a bearing 126 formed in a fixed portion of the machine. The control rod 116 is keyed to be rotated as a unit with the sleeve member 124, and to move axially with relation thereto, by means of a key 128 in the control rod which engages with a corresponding keyway in the sleeve element 124.

In accordance with the invention, the control rod 116 is provided at one end with a pair of clutch shifting fingers which are arranged to be acted upon by means of shift cams formed on the two faces of the main driving gear 44. The operation of the fingers and cams associated therewith is controlled by imparting rocking movements to the control rod 116 which serve to position one or the other finger in position to cause the cams engaging therewith to positively shift the clutch from one to another of the alternative neutral, feed and quick traverse driving positions. The rotational movements of the control rod 116 are in turn controlled by means of solenoids and a centering spring system which acts on the rotatable sleeve 124 previously described. At its right hand end, as shown in Fig. 2, the rod 116 has supported thereon a bracket 132 which provides a support for two clutch shifting fingers 134 and 136. The finger 134 is rigidly supported in a receiving slot 138 by means of screws 140, and is particularly adapted to cooperate with any one of a series of cam elements 142 formed on the right hand or outer face of the gear 44 as viewed in Fig. 2. The finger 136 is similarly supported in a groove 144 formed on the left hand or inner face of the bracket 132, and is held in position thereon by means of machine screws 146. The finger 136 is particularly arranged to cooperate with any one of a number of cams 148 formed on the inner face of the gear 44. The fingers 134, 136 in addition to being mounted at opposite faces of the bracket 132 are also mounted on the opposite sides of the axis of rotation of the control rod 116, so that rotational movement of the control rod from the intermediate neutral position of Figs. 2 and 8, will cause one or the other shifting finger to be moved downwardly to a different operative position with relation to its cam, while the other of said fingers is moved upwardly to a wholly disengaged inoperative position. As best shown in Fig. 8 of the drawings, each of the fingers 134, 136 is provided with two outwardly stepped cam engaging surfaces, the finger 134 being provided with an outwardly disposed cam engaging surface 150 and an inwardly stepped cam engaging surface 152, and the finger 136 being similarly provided with an outwardly disposed cam engaging surface 154 and an additional inwardly stepped cam engaging surface 156. These cam engaging surfaces of the shifting fingers are so constructed and arranged that for an intermediate or neutral angular position of the control rod 116 as shown in Figs. 2 and 8, the outwardly stepped cam surfaces 150 and 154 respectively of the fingers 134, 136 are in operative relation to their respective cams 142 and 148. For this position of the parts, it will readily be seen that the control rod 116 is positively held in the intermediate neutral position illustrated in Fig. 2. Assuming that the control rod 116 is now rocked in a clockwise direction to the position shown in Fig. 5, the inner or left hand shifting finger 136 is moved upwardly to a fully inoperative position in which it is outside the periphery of the driving gear 44, while at the same time the finger 134 is moved downwardly so that the inwardly stepped cam engaging surface 152 is brought into the path of movement of the cams 142, causing the finger 134 and the bracket 132 on which it is mounted and the control rod 116 to be shifted bodily to the right, as shown in Fig. 4, to shift the feed-quick traverse clutch to the quick traverse position. This is also the position shown in dotted lines in Fig. 8. When the control rod 116 is again rocked to its intermediate or neutral position, the inner stepped surface 152 is shifted out of the path of movement of the cams 142, and the lower or outer stepped surface 154 of the finger 136 is moved into the path of its cooperating cam 148 to cause the finger assembly, control rod 116 and clutch shifting fork 112 to be shifted to the intermediate neutral position. A rocking movement of the control rod 116 in a counterclockwise direction to the position shown in Fig. 7, serves to move the shifting finger 134 to a fully raised inoperative position, and at the same time to move the finger 136 downwardly so that the inner stepped surface 156 is brought into the path of movement of the cooperating cams 148, thus causing the clutch to be moved to the feed position. A return rocking movement of the control rod 116 to its intermediate position will cause the lower or outer stepped surface 150 of the shifting finger 134 to be brought into the path of movement of its cooperating cams 142 to return the clutch to the intermediate neutral position.

Further in accordance with the present invention, the angular position of the control rod 116 to determine the setting of the feed-quick traverse clutch is arranged to be controlled entirely by means of electrically operated means. As best shown in Figs. 2 and 3 of the drawings, the sleeve member 124 to which the control rod 116 is keyed, is provided on its rear face with an eccentric pin 160 to which is connected the armature shaft 162 of a double acting solenoid 164. The solenoid is provided with two coils 166 and 168 which are arranged to be alternatively energized to cause the armature shaft 162 to be shifted either upwardly or downwardly as desired from the intermediate position illustrated in Figs. 2 and 3, to correspondingly rock the control rod 116. The solenoid is secured to a plate bracket 170 pivotally supported at its lower end on a pivot pin 172, so that the upper end of the solenoid and the armature 162 are permitted to follow the arcuate movement of the connecting pin 160. The sleeve member 124 is provided also with a laterally extending arm to which is connected the upper end of a centering spring supporting rod 176 which is slidably supported intermediate its length within a collar 178 supported on a laterally extending pivot pin 180 on the machine frame. Centering springs 182 and 184 coiled about the rod 176 and engaging between opposite sides of the collar 178 and cooperating abutments on the rod 176, tend at all times to return the control rod 116 to its intermediate inoperative position.

Under certain conditions of operation, it is frequently desirable to shift the feed-quick traverse clutch directly from one to the other clutching position. Assuming that the solenoid 168 is energized and the shifting finger 134 is depressed so that the control rod 116 is in the quick traverse position as shown in Figs. 4 and 5, it may, for example, be desired to de-energize the solenoid 168 and to energize the solenoid 166 to shift the clutch to the feed position. With the parts in the position of Figs. 4 and 5, and as shown in dotted lines in Fig. 8, an immediate rocking of the control rod 116 to the alternate feed position would have the effect of moving the feed shifting finger 136 downwardly into interfering engagement with the main driving gear 44 with consequent breakage of the parts. In order to avoid this contingency, a safety device is provided which acts positively to prevent rocking movement of the control rod 116 and shifting fingers 134, 136 beyond the intermediate position until after the control rod 116 and associated parts have been shifted axially to the intermediate neutral position, whereupon the solenoid 166 continuously acting on the armature 162 is permitted to continue the rocking movement of the control rod 116 to the alternate feed position to engage the clutch in the feed position as shown in Figs. 6 and 7. The mechanism for positively controlling the rocking movement of the rod 116 comprises the collar 120 rigidly secured to the control rod 116 which is squared off to provide on its under side an engaging surface 186 for engagement with two pins 188 and 190 formed on a lateral extension 192 of a machine supporting frame. The pins 188, 190 are spaced at opposite sides of the control rod 116, and are disposed also axially with relation to one another along the control rod 116. For the intermediate or neutral position of the control rod 116, the block 120 is disposed between the pins 188, 190, and can have no effect on the rocking movement of the shaft. The disposition of the pins 188, 190 is such as to permit movement of the control rod in its rocked position axially to the quick traverse position as shown in Figs. 4 and 5. If the electrical operating connections of the machine are now shifted to the alternate feed position, the pin 190 will act in engagement with the surface 186 of the collar 120 as indicated in Fig. 4, to prevent any rocking movement of the control rod 116 beyond the intermediate neutral position. As the control rod 116 is now returned to its intermediate position as above described, the surface 186 of the collar 120 rides out of engagement with the pin 190, thus permitting the control rod 116 to be rocked to the alternate feed position, and to be shifted axially thereto, as indicated in Figs. 6 and 7.

With the present construction, a braking and detent mechanism is provided which serves to maintain the clutch control rod yieldably in each of its neutral and quick traverse positions and is rendered operative upon the shifting of the feed-quick traverse clutch to its neutral position to mechanically brake the driven shaft 60 and the parts driven therefrom. The braking and detent mechanism, as best shown in Figs. 2 and 3, comprises a cone-shaped braking member 194 supported on a sleeve member which also carries a disk 196, these parts being keyed to turn with and to be axially movable upon the driven shaft 60. A compression spring 198 coiled about the shaft 60 between the brake disk 196 and a collar 200 tends normally to move the brake into its engaging position. A shifting fork 202 pivotally suspended from a pivot pin 204 engages with a face of the disk 196, and is in turn acted upon by a control lever 206 supported to turn on a pivot 208, and provided with an upward extension and an adjustable stop screw 210 for engagement therewith. The control lever 206 is provided at its outer end with a V-shaped projection 212 for engagement with any one of three V-shaped notches formed in a sleeve member 214 which is pinned to the sleeve hub of the clutch shifting fork 112 axially as a unit therewith. In the intermediate or neutral position of the clutch, the control rod 116 and associated parts, the V-shaped member 212 is engaged within a relatively large V-shaped groove 216 in the sleeve 214, permitting the control lever 206 to be rocked downwardly sufficiently so that the brake 194 is engaged under the influence of its spring 198. Movement of the control rod 116 in either direction to the clutching position, causes the follower 212 to ride onto a high portion of the periphery of the sleeve 214 where it is engaged in one of two shallow V-shaped grooves 218, 220, so that the brake 194 is disengaged, and the control rod and associated parts will be held yieldably in the clutching position.

The operation of the electrical control system of the machine for controlling the operation of the feed-quick traverse clutch will be readily understood from an inspection of Fig. 9 of the drawings, in which is illustrated the electrical diagram of a system suitable for a milling machine having a table driving motor 38, a pump motor and a spindle motor for driving the milling cutter spindle of the machine. The feed and quick traverse solenoids 166, 168 are indicated at the bottom of Fig. 9, and are shown in a circuit which includes the contact T19—5. This contact is in turn controlled by means of a relay T. In the event that the table is to be operated at the feed rate, the closing of a starting switch contact 4—6, and either the right or left directional relay switch contact 6—8, will cause the relay T to be energized to close contact T19—5 so that solenoid 166 marked "Feed" will be energized, causing the feed-quick traverse clutch to be shifted to the feed position, as above set forth. It will be noted that each of the feed-quick traverse switches having feed contacts 4—16, 16—17 and 17—18, respectively, is normally biased to the feed position illustrated in Fig. 9 by spring means acting on the respective switches so that the energizing of the relay T only is required to shift the feed-quick traverse clutch to the feed position. In the event that movement of the support is to be continued at the quick traverse rate, the pressing of any one of the quick traverse switches designated QT and shown in the lower portion of diagrammatic Fig. 9, will cause the designated switch contact 4—16, 16—17 or 17—18 to be opened, thus de-energizing the feed clutch solenoid 166, and will cause the corresponding one of the switch contacts 4—21 to be closed, energizing the quick traverse clutch solenoid 168. In the event that the machine is to be jogged at quick traverse with the spindle motor stopped, the pressing of one of the QT switches above noted will act in a similar manner to establish a circuit through the quick traverse solenoid 168. In this case, a circuit is established through connection 8 to energize the relay T and to close the switch contact T19—5.

Assuming that the machine is operating at quick traverse but with switch L or R closed and the spindle motor running, when the quick traverse switch QT is now released and permitted to return to its normal raised position shown in Fig. 9 under the pressure of its actutaing spring, the circuit through the quick traverse solenoid 168 is opened and the circuit through the feed solenoid 166 is closed to again shift the quick feed traverse clutch through the neutral position to the feed position. If, on the other hand, the work support is being moved into position at quick traverse, as above suggested, with the spindle motor not running, so that the switch contacts R6—8 and L6—8 are both open, the release of the quick traverse switch will have the effect also of de-energizing solenoid T, thus opening switch contact T19—5. Since both the feed and quick traverse solenoids 166, 168 are now de-energized, the feed-quick traverse clutch returns to the neutral position, as above set forth.

Assuming that the support is traveling at the feed rate and that it is desired to stop the machine, one of the switches marked "Stop" on the diagram is pressed, causing the entire secondary circuit to be rendered inoperative, so that relay contact R or L6—8 opens, de-energizing relay T, and the contact T19—5 opens. Inasmuch as the entire secondary circuit is now disconnected, the feed solenoid 166 is de-energized and the power operated shift mechanism becomes operative to return the clutch to the neutral position to stop the machine.

It will be understood that the examples above given of the operation of the electrical control system including the feed and quick traverse solenoids 166, 168 for the quick traverse clutch are by way of illustration only, and that the electrical controls described are equally well adapted for operation in accordance with other operating cycles. It will be understood also that the several operating switches illustrated may be controlled either manually or by automatic means, if so desired.

The nature and scope of the invention having been indicated and a machine embodying the several features of the present invention having been specifically described, what is claimed is:

1. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising clutch shifting means, a continuously rotating cam element having operating surfaces co-acting with said clutch shifting means to shift the clutch in opposite directions, follower means connected with said clutch shifting means having follower surfaces arranged to be acted upon selectively by said operating surfaces for shifting the clutch, and means for shifting the follower surfaces and operating surfaces relatively to cause selected follower and operating surfaces to co-act selectively with one another to shift the clutch from any one to another of said neutral and clutching positions.

2. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising clutch shifting means, a continuously rotating cam element having oppositely disposed operating surfaces, follower means connected with said clutch shifting means comprising a pair of shift fingers shiftable for engagement in a plurality of different operating relations respectively with said oppositely disposed operating surfaces for shifting the clutch, and operating means for shifting said fingers for controlling the relation of said fingers to the respective operating surfaces to cause the clutch to be shifted selectively from any one to another of said neutral and clutching positions.

3. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising a clutch shifting member, a continuously rotating cam element having cam surfaces disposed on opposite faces thereof, and follower means comprising a pair of shifting fingers associated with said clutch shifting member, each having two cam engaging surfaces stepped outwardly with relation to one another arranged to be acted upon by the respective operating surfaces, means for controlling the position of said fingers to move one or the other of said steps of a selected finger into the path of movement of the cooperating cam, and means for shifting the position of said fingers to cause the clutch to be shifted selectively from any one to another of said neutral and clutching positions.

4. A driving and control mechanism for a machine tool support which comprises power driving connections for driving the support alternatively at feed and quick traverse rates including a feed and quick traverse clutch having neutral and alternative feed and quick traverse clutching positions, and control means therefor comprising an axially movable clutch shifting rod, a continuously rotating cam having its rotational axis parallel with that of the shift rod, and having cam surfaces disposed on opposite faces thereof, and follower means comprising a pair of shifting fingers, each having two cam engaging surfaces stepped outwardly with relation to one another supported on said rod and arranged at opposite sides of the rod axis to be acted upon by the respective cam surfaces, said fingers being arranged for one angular position of the rod with the outer stepped portions thereof in the path of the respective operating surfaces to maintain the rod axially in neutral position, said fingers being further arranged so that for a rocked position of the rod in either direction from said angular position, one of said fingers is located with the inner stepped portion thereof in operative relation to its cooperating cam surface and the other of said fingers is wholly removed from its cooperating cam surface, and means for rocking the shift rod in either direction to and from said neutral position.

5. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising clutch shifting means, a continuously rotating cam element having oppositely disposed operating surfaces, follower means associated with said clutch shifting means arranged to be acted upon by said operating surfaces for shifting the clutch, and electrically operated positioning devices including a solenoid for controlling the relation of the follower means to the operating surfaces to cause the clutch to be shifted selectively from any one to another of said neutral and clutching positions.

6. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising clutch shifting means, a continuously rotating cam element having oppositely disposed operating surfaces, follower means associated with said clutch shifting means comprising a pair of shift fingers arranged for engagement respectively with said oppositely disposed operating surfaces for shifting the clutch, and electrically operated positioning means for moving said fingers selectively into the path of movement of the respective operating surfaces to cause the clutch to be shifted to one or the other of said clutching positions.

7. A driving and control mechanism for a machine tool support which comprises power driving connections for driving the support alternatively at feed and quick traverse rates including a feed and quick traverse clutch having neutral and alternative feed and quick traverse clutching positions, and control means therefor comprising an axially movable clutch shifting rod, a continuously rotating cam having its rotational axis parallel with that of the shift rod, and having cam surfaces disposed on opposite faces thereof, and follower means comprising a pair of shifting fingers supported on said rod and arranged at opposite sides of the rod axis to be acted upon by the respective cam surfaces, and control devices for rocking the rod whereby one of said fingers is moved into operative relation with the cooperating cam surface to shift the rod axially to clutching position, said control devices comprising a solenoid and connections therefrom for rocking the rod, and spring means tending to rock the rod to an intermediate neutral position.

8. A driving and control mechanism for a machine tool support which comprises power driving connections for driving the support alternatively at feed and quick traverse rates including a feed and quick traverse clutch having neutral and alternative feed and quick traverse clutching positions, and control means therefor comprising an axially movable clutch shifting rod, a continuously rotating cam having its rotational axis parallel with that of the shift rod, and having cam surfaces disposed on opposite faces thereof, and follower means comprising a pair of shifting fingers supported on said rod and arranged at opposite sides of the rod axis to be acted upon by the respective cam surfaces, each of said fingers having two cam engaging surfaces stepped outwardly with relation to one another and arranged so that for an intermediate angular position of the rod the outer stepped portions are in the path of the respective operating surfaces to maintain the rod axially in neutral position, said fingers being further arranged so that for a rocked position of the rod in either direction from said intermediate angular position, one of said fingers is located with the inner stepped portion thereof in operative relation to its cooperating cam surface for shifting the rod axially to clutching position, and electrically operated control devices for rocking the rod comprising spring means tending to maintain the rod in said intermediate angular position, and solenoids acting when energized to rock the control rod in either direction from said intermediate angular position.

9. A driving and control mechanism for a machine tool support which comprises power driving connections for driving the support alternatively at feed and quick traverse rates including a feed and quick traverse clutch having neutral and alternative feed and quick traverse clutching positions, and control means therefor comprising an axially movable clutch shifting rod, a continuously rotating cam having its rotational axis parallel with that of the shift rod, and having cam surfaces disposed on opposite faces thereof, and follower means comprising a pair of shifting fingers supported on said rod and arranged at opposite sides of the rod axis to be acted upon by the respective cam surfaces, each of said fingers having two cam engaging surfaces stepped outwardly with relation to one another and arranged so that for an intermediate angular position of the rod the outer stepped portions are in the path of the respective operating surfaces to maintain the rod axially in neutral position, said fingers being further arranged so that for a rocked position of the rod in either direction from said angular position, one of said fingers is located with the inner stepped portion thereof in operative relation to its cooperating cam surface for shifting the rod axially to clutching position, electrically operated control devices for rocking the rod comprising spring means tending to maintain the rod in said intermediate angular position, solenoids connected when energized to rock the control rod in either direction from said angular position, and safety means comprising relatively stationary guiding elements and surfaces on the shift rod operative to prevent rocking of the shaft from either clutching position beyond the neutral position until the shaft has been moved axially to the neutral position.

10. A driving and control mechanism for a machine tool support which comprises power driving connections for driving the support alternatively at feed and quick traverse rates, including a feed and quick traverse clutch having neutral and alternative feed and quick traverse clutching positions, and control means including an axially movable clutch shifting rod shiftable between neutral and alternative feed and quick traverse clutching positions, a continuously rotating cam having its rotational axis parallel with that of the shift rod, and having cam surfaces disposed on opposite sides thereof, follower means associated with the shift rod comprising a pair of shifting fingers arranged for engagement respectively with said oppositely disposed surfaces for shifting the clutch, means for controlling the relation of the fingers to the respective operating surfaces to cause the clutch to be shifted selectively from any one to another of said neutral and clutching positions, a mechanical brake connected with the clutch driven element, and means for controlling the operation of the brake comprising a sleeve on the control rod having a deep recess and two shallow recesses at either side thereof, and a brake control lever having a follower element arranged for the neutral position of the rod to engage in said deep recess to permit the setting of the brake, and for either clutching position of the control rod to engage in the corresponding shallow recess to release the brake.

11. A driving and control mechanism for a machine tool support, which comprises power driving connections for driving the support alternatively at feed and quick traverse rates including a feed-quick traverse clutch having neutral and alternative feed and quick traverse clutching positions, and control means therefor comprising clutch shifting means, continuously driven operating means follower means connected with the clutch shifting means, means for shifting the follower means to be acted upon by said operating means in different operating relations for shifting the clutch, and control means for shifting the position of the follower means with relation to the operating means to cause the clutch to be shifted positively from any one to another of said neutral and clutching positions.

12. A driving and control mechanism for a machine tool support, which comprises power driving connections for driving the support alternatively at feed and quick traverse rates including a feed-quick traverse clutch having neutral and alternative feed and quick traverse clutching positions, and control means therefor comprising clutch shifting means including an axially shiftable and rotatable shift rod, continuously driven operating means, follower means associated with the shift rod arranged to be positioned with relation to said operating means by rocking movement of the shift rod to shift the rod axially to shift the clutch positively from any one to another of said neutral and clutching positions, and means for controlling the angular position of said shift rod.

13. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising clutch shifting means, continuously driven operating means, follower means associated with the clutch shifting means arranged to be acted upon by said operating means for shifting the clutch, electrical operating positioning means acting when energized for controlling the relation of the follower means to the actuating means to cause the clutch to be shifted positively to one of said clutching positions, and yieldable means rendered operative by the de-energizing of said electrical positioning means for controlling the relation of the follower means to the actuating means to cause the clutch to be shifted positively to the neutral position.

14. A driving and control mechanism for a machine tool support which comprises power driving connections for driving the support alternatively at feed and quick traverse rates including a feed-quick traverse clutch having neutral and alternative feed and quick traverse clutching positions, and control means therefor comprising clutch shifting means including an axially shiftable and rotatable shift rod, continuously driven operating means, follower means associated with the shift rod arranged to be positioned with relation to said operating means by rocking movement of the shift rod to shift the rod axially and the clutch therewith positively from any one to another of said neutral and clutching positions, electrical means acting when energized to rock the shift rod to one of said clutching positions, and spring means rendered operative upon the de-energizing of said electrical means to rock said shift rod to the neutral position.

15. A driving and control mechanism for a machine tool support which comprises power driving connections for driving the support alternatively at feed and quick traverse rates including a feed-quick traverse clutch having neutral and alternative feed and quick traverse clutching positions, mechanical braking means in said driving connections, and control means therefor comprising clutch shifting means, electrically operated positioning devices acting when energized to render said clutch shifting means operative to shift the clutch to one or the other of said clutching positions and to release the braking means, and spring means acting in opposition to said electrically operated devices and operative when the same are de-energized to shift the clutch to neutral position and to set the brake.

GEORGE B. HIRSCH.